US007558534B2

(12) United States Patent
Stein et al.

(10) Patent No.: US 7,558,534 B2
(45) Date of Patent: Jul. 7, 2009

(54) RELIABILITY METRICS FOR PARAMETER ESTIMATES WHICH ACCOUNT FOR CUMULATIVE ERROR

(75) Inventors: Jeremy Stein, Haifa (IL); Ivan Fernandez-Corbaton, San Diego, CA (US); Roland R. Rick, San Diego, CA (US); Messay Amerga, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 279 days.

(21) Appl. No.: 10/125,182

(22) Filed: Apr. 17, 2002

(65) Prior Publication Data

US 2003/0087604 A1    May 8, 2003

Related U.S. Application Data

(60) Provisional application No. 60/337,875, filed on Nov. 2, 2001.

(51) Int. Cl.
*H04B 17/00* (2006.01)
*H04M 1/00* (2006.01)

(52) U.S. Cl. ............... 455/67.11; 455/67.13; 455/67.16; 455/556.1

(58) Field of Classification Search ............... 455/63.1, 455/67.11, 67.13, 67.14, 67.16, 517, 556.1, 455/456.1, 423, 65, 66.1; 375/142, 150, 375/343

See application file for complete search history.

(56) References Cited

U.S. PATENT DOCUMENTS 3,810,082 A    5/1974    Arens (Continued)

FOREIGN PATENT DOCUMENTS

EP    1083440    3/2001

(Continued)

OTHER PUBLICATIONS

Linatti, J., "DS Code Acquisition is Slowly Fading Multi-path Channel" IEEE—University of Oulu, Telecommunications Laboratory 2000 pp. 2408-2413.

(Continued)

*Primary Examiner*—George Eng
*Assistant Examiner*—Un C Cho
(74) *Attorney, Agent, or Firm*—Andrea L. Mays; Bruce W. Greenhaus

(57) ABSTRACT

A method of producing a reliability metric for a parameter estimate derived from a signal using correlation analysis is described. The method begins by obtaining an indication of whether a non line of sight signal condition is present or likely and/or obtaining an indication of whether a multi-path signal condition is present or likely. Responsive to one or both of these indications, the method derives a reliability metric for the parameter estimate. In one embodiment, the parameter estimate is an estimate of time of arrival (TOA) of the signal, and the reliability metric is root mean square error (RMSE) of the time of arrival estimate. This embodiment obtains an indication of whether a non line of sight signal condition is present or likely based on a measure of the strength of the correlation function at the peak thereof. The measure of the strength of the correlation function at the peak thereof may be energy per chip divided by total received power ($E_c/I_0$) or may simply be the raw energy of the correlation function at the peak. The RMSE metric which is computed in this embodiment varies inversely with the peak strength of the correlation function.

26 Claims, 14 Drawing Sheets

U.S. PATENT DOCUMENTS

| | | | |
|---|---|---|---|
| 4,387,465 A | 6/1983 | Becker | |
| 4,809,005 A | 2/1989 | Counselman, III | |
| 5,027,148 A | 6/1991 | Anagnostopoulos | |
| 5,608,703 A | 3/1997 | Washisu | |
| 5,644,591 A | 7/1997 | Sutton | |
| 5,703,597 A | 12/1997 | Yu et al. | |
| 5,790,589 A | 8/1998 | Hutchison et al. | |
| 5,872,774 A | 2/1999 | Wheatley, III et al. | |
| 5,872,776 A | 2/1999 | Yang | |
| 6,044,104 A | 3/2000 | Watanabe | |
| 6,133,873 A | 10/2000 | Krasner | |
| 6,204,812 B1 | 3/2001 | Fattouche | |
| 6,208,297 B1 | 3/2001 | Fattouche et al. | |
| 6,229,842 B1 | 5/2001 | Schulit et al. | |
| 6,266,014 B1 * | 7/2001 | Fattouche et al. | 342/450 |
| 6,324,210 B1 | 11/2001 | Yant et al. | |
| 6,341,140 B1 | 1/2002 | Lee et al. | |
| 6,379,013 B1 | 4/2002 | Bechtel et al. | |
| 6,477,162 B1 | 11/2002 | Bayley et al. | |
| 6,493,378 B1 * | 12/2002 | Zhodzishsky et al. | 375/149 |
| 6,507,571 B1 | 1/2003 | Yamamoto | |
| 6,519,277 B2 | 2/2003 | Eidson | |
| 6,687,507 B2 * | 2/2004 | Fischer et al. | 455/456.6 |
| 6,738,438 B2 | 5/2004 | Rick et al. | |
| 6,756,940 B2 * | 6/2004 | Oh et al. | 342/387 |
| 6,785,321 B1 * | 8/2004 | Yang et al. | 375/137 |
| 6,836,518 B1 | 12/2004 | Sano et al. | |
| 6,865,395 B2 | 3/2005 | Riley | |
| 6,944,207 B2 | 9/2005 | Ohno | |
| 6,973,119 B2 * | 12/2005 | Yotsumoto | 375/147 |
| 7,006,556 B2 | 2/2006 | Abraham et al. | |
| 7,039,418 B2 | 5/2006 | Amerga et al. | |
| 7,308,022 B2 | 12/2007 | Rick et al. | |
| 2003/0081661 A1 | 5/2003 | Stein et al. | |
| 2003/0087604 A1 | 5/2003 | Stein et al. | |
| 2006/0274823 A1 | 12/2006 | Stein et al. | |

FOREIGN PATENT DOCUMENTS

| | | |
|---|---|---|
| WO | 0045191 | 8/2000 |
| WO | 0054424 | 9/2000 |
| WO | 0070792 | 11/2000 |
| WO | 0176092 | 10/2001 |
| WO | 03039020 | 5/2003 |
| WO | 03039021 | 5/2003 |
| WO | 03038467 | 8/2003 |

OTHER PUBLICATIONS

Bar-David, et al., "Barker Code Position Modulation for High-rate Communication in the ISM Bands", Bell Labs Technical Journal Autumn 96 pp. 21-40et al., "Barker Code Position Modulation for High-rate Communication in the ISM Bands", Bell Labs Technical Journal Autumn 96 pp. 21-40avid, et al., "Barker Code Position Modulation for High-rate Communication in the ISM Bands", Bell Labs Technical Journal Autumn 96 pp. 21-40.

Linatti, J., "On the Threshold Setting Principles in Code Acquisition of DS-SS Signals", IEEE Journal on Selected Areas in communication vol. 18, No. 1, Jan. 2000, pp. 52-72.

International Search Report-PCT/US2002/035273, International Search Authority-European Patent Office, Jul. 11, 2003.

* cited by examiner

RELIABILITY METRICS FOR PARAMETER ESTIMATES WHICH ACCOUNT FOR CUMULATIVE ERROR

RELATED APPLICATIONS

This application claims priority to U.S. Provisional Application No. 60/337,875, filed on Nov. 2, 2001.

FIELD OF THE INVENTION

This invention relates to the field of parameter estimates derived using correlation analysis, and more specifically, to reliability metrics for such estimates which account for factors such as lack of line-of-sight and multi-path.

RELATED ART

The Global Positioning System (GPS) is a collection of satellites each of which travels in a precise orbit above the earth's surface. Each satellite transmits a signal modulated with a pseudo-noise (PN) code unique to the satellite. Each PN code comprises a predetermined number of chips. A GPS receiver receives a composite signal comprising a mixture of signals from each of the satellites that are visible to the receiver. A signal detector in the receiver detects a transmission from a particular satellite by determining the degree of correlation between the received signal and shifted versions of the PN code for that satellite. If a peak of sufficient quality in the correlation value for one of the shift offsets is detected, the receiver is considered to have detected the transmission from the satellite.

The receiver estimates its location by detecting transmissions from at least four of the satellites. For each detected transmission, the receiver uses the shift in the PN code to estimate the delay (in terms of chips or fractions of chips) between time of transmission and time of arrival. Given the known velocity of the transmission, the receiver estimates the distance between itself and the satellite. This estimated distance defines a sphere around the satellite. The receiver knows the precise orbits and positions of each of the satellites, and continuously receives updates to these orbits and positions. From this information, the receiver is able to determine its position (and the current time) from the point where the spheres for the four satellites intersect.

The FCC has mandated that subscriber stations, including but not limited to mobile stations, in wireless communications systems be capable of estimating their locations in order to promote rapid responses to 911 and other emergency calls. In response to this mandate, efforts are underway to equip subscriber stations with the means to estimate their locations from GPS satellite transmissions. Moreover, since base stations or sectors in wireless communications systems transmit pilot signals modulated with unique PN codes, these efforts also include allowing subscriber stations to estimate their locations from the transmissions of multiple base stations or sectors, or combinations of base stations or sectors and GPS satellites.

A signal detector in a GPS receiver attempts to detect the transmission of a satellite from the peak of a correlation function which is derived by multiplying the received signal (which is typically a composite signal comprising a mixture of the transmissions from multiple satellites) with shifted versions of the PN code for the satellite within a range defined by a predetermined search window, and then, for each shifted PN code, adding the multiplied values over a predetermined integration time to achieve a value representative of the degree of correlation between the received signal and the shifted PN code. If the peak is detected, the signal detector may then estimate one or more parameters, such as time of arrival, from the peak.

For certain parameters, in particular, time of arrival (TOA), the GPS receiver estimates the root mean square error (RMSE) of the TOA estimate in order to provide an indication of the reliability and therefore weight to be given to the TOA estimate during the position determination process. The GPS receiver estimates the RMSE of the TOA estimate based on the noise at the receiver, which in turn depends on factors such as the integration time employed in producing the correlation function. Since the satellite transmissions are typically not subject to degradations due to lack of line of sight, or multi-path, the GPS receiver does not generally consider these factors in producing the RMSE estimates. Consequently, in an environment in which signals are subject to degradations due to lack of line of sight and multi-path, the GPS receiver would likely overestimate the reliability of the time of arrival estimates, and therefore accord too much weight to these estimates in the position determination process. Range errors would likely be introduced into the position estimates of the subscriber station which would violate the FCC's mandate that the positions of subscriber stations be estimated with an accuracy of ±150 meters 95% of the time, and an accuracy of ±50 meters 67% of the time.

RELATED APPLICATIONS

This application is related to U.S. patent application Ser. No. 10/057,689, filed Oct. 29, 2001, U.S. Pat. No. 6,738,438, and U.S. patent application Ser. No. 10/060,885, filed on Nov. 1, 2001, Qualcomm Dkt. Nos. 010374, 010375, and 010376, and owned in common by the assignee hereof. These applications are each fully incorporated by reference herein as though set forth in full.

SUMMARY

The invention provides a method of producing a reliability metric for a parameter estimate derived from a signal using correlation analysis. The method begins by obtaining an indication of whether a non line of sight signal condition is present or likely. Responsive to this indication, the method derives a reliability metric for the parameter estimate.

In one embodiment, the parameter estimate is an estimate of time of arrival (TOA) of the signal, and the reliability metric is root mean square error (RMSE) of the time of arrival estimate. The time of arrival estimate may be derived from the time and/or position of a peak of a correlation function for the signal. In this embodiment, the method obtains an indication of whether a non line of sight signal condition is present or likely based on a measure of the strength of the correlation function at the peak thereof. The measure of the strength of the correlation function at the peak thereof may be energy per chip divided by total received power ($E_c/I_0$). Alternatively, or in addition, the measure of the strength of the correlation function at the peak thereof may be the energy of the correlation function at the peak.

In one implementation, the RMSE of the TOA estimate is derived using a lookup table. The lookup table may implement a non-linear relationship between the RMSE of the TOA estimate and the strength of the correlation function at the peak thereof. Alternatively, or in addition, the lookup table may implement a relationship between the RMSE of the TOA estimate, the strength of the correlation function at the peak thereof, and the integration time used to derive the correlation function. The non-linear relationship between the RMSE and the TOA estimate implemented by the lookup table may be an inverse relationship where the RMSE which is derived varies inversely with the strength of the correlation function at the peak thereof.

In a second implementation, the RMSE of the TOA estimate is derived using a formula. The formula may implement a non-linear relationship between the RMSE of the TOA estimate and the strength of the correlation function at the peak thereof. Alternatively, or in addition, the formula may implement a relationship between the RMSE of the TOA estimate, the strength of the correlation function at the peak thereof, and the integration time used to derive the correlation function. The non-linear relationship between the RMSE and the TOA estimate implemented by the formula may be an inverse relationship where the RMSE which is derived varies inversely with the strength of the correlation function at the peak thereof.

In a second embodiment, the method obtains an indication of whether a non line of sight signal condition is present or likely, obtains an indication of whether a multi-path signal condition is present or likely, and, responsive to one or both of these indications, derives a reliability metric for the parameter estimate. In one implementation, the step of deriving a reliability metric for the parameter estimate comprises deriving the reliability metric responsive to an indication of the likelihood of distinguishing an earlier peak of the correlation function from a later-in-time peak.

In a third embodiment, the method obtains an indication of whether a multi-path signal condition is present or likely, and then derives, responsive to this indication, a reliability metric for the parameter estimate.

Related systems, processor readable media, computer program products, reliability metrics, etc., are also provided.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The components in the figures are not necessarily to scale, emphasis instead being placed upon illustrating the principles of the invention. In the figures, like reference numerals designate corresponding parts throughout the different views.

DETAILED DESCRIPTION

Example Application

Figure 1:
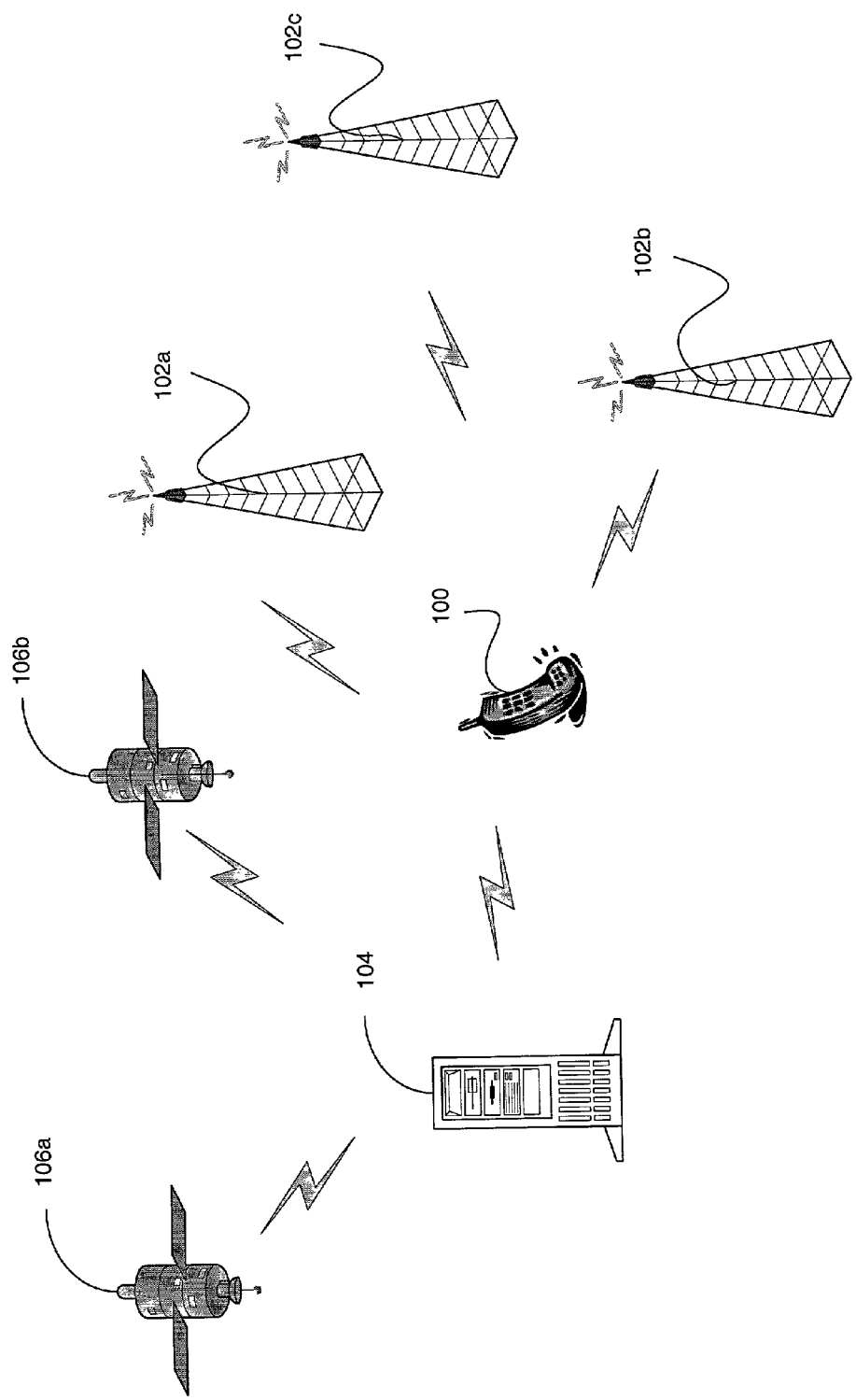
FIG. 1 is an example application of a system according to the invention.

Referring to FIG. 1, an example application of a system for or method of producing the reliability metric of the invention is illustrated. In this example application, the system and/or method is employed within subscriber station 100 in conjunction with a parameter estimator for the purpose of estimating the location of subscriber station 100. The parameter estimator is configured to estimate parameters of a signal such as time of arrival. The system/method may be part of, or independent of, the parameter estimator. The subscriber station 100 is a component of a wireless communication system such as but not limited to cellular, fixed wireless, PCS, and satellite communications systems. Moreover, the wireless communications system may provide for multiple access in accordance with CDMA, TDMA, FDMA, or GSM multiple access protocols, or combinations thereof.

One or more base station(s) or sector(s) 102a, 102b, and 102c are employed in the wireless communications system. Each base station or sector 102a, 102b, 102c transmits a pilot signal which is modulated with a repeating pseudo-random noise (PN) code which uniquely identifies that base station or sector. For IS-95 compliant CDMA systems, the PN code is a sequence of 32,768 chips which is repeated every 26.67 mSec.

One or more GPS satellites 106a, 106b may also be visible to the subscriber station 100 or position determination entity (PDE) 104. Each of the GPS satellites also transmits a signal which is modulated with a repeating PN code which uniquely identifies that satellite. In current GPS systems, the PN code is a sequence of 1,023 chips which is repeated every millisecond.

The parameter estimator within subscriber station 100 is configured to estimate various parameters of the pilot signals transmitted from the base stations or sectors 102a, 102b, and 102c and/or the signals transmitted from the GPS satellites 106a, 106b. Such parameters may include TOA, time of transmission, energy per chip divided by total received power ($E_c/I_0$). The system and/or method of the invention within subscriber station 100 is configured to determine reliability metrics, including but not limited to root mean squared error (RMSE), for one or more of these parameters, such as the TOA estimate, etc.

The parameters, once estimated, and the reliability metrics, are provided to PDE 104 which estimates the location of subscriber station 100 responsive thereto. (The PDE 104 may be a sever in a public computer network such as the Internet or other TCP/IP network, a private network, or some other network.) In particular, the PDE 104 may employ the reliability metrics to determine the weight to be given to the corresponding parameters during the position determination process. Once estimated, the position of the subscriber station 100 is downloaded to it so that it is available from the subscriber station 100 in the event of a 911 or other emergency call.

The PDE 104 may estimate the location of the subscriber station 100 from the measurements relating to the base stations or sectors 102a, 102b, and 102c, or, to increase accuracy, from the combined measurements of one or more of the base station(s) or sector(s) 102a, 102b, 102c and one or more of the GPS satellite(s) 106a, 106b. In a process referred to as Advanced Forward Trilateration (AFLT), the PDE 104 estimates the location of the subscriber station 100 responsive to the transmissions from four or more base stations or sectors in a manner analogous to the GPS procedure.

The PDE 104 may provide other forms of assistance to the subscriber station 100. For example, PDE 104 may continuously track the GPS satellites, and provide assistance to the subscriber station 100 in locating the signals transmitted from the GPS satellites 106a, 106b. This avoids the need to have the subscriber station 100 undergo time-consuming "cold start" procedures for locating the satellites when it is powered up.

Figure 2A:
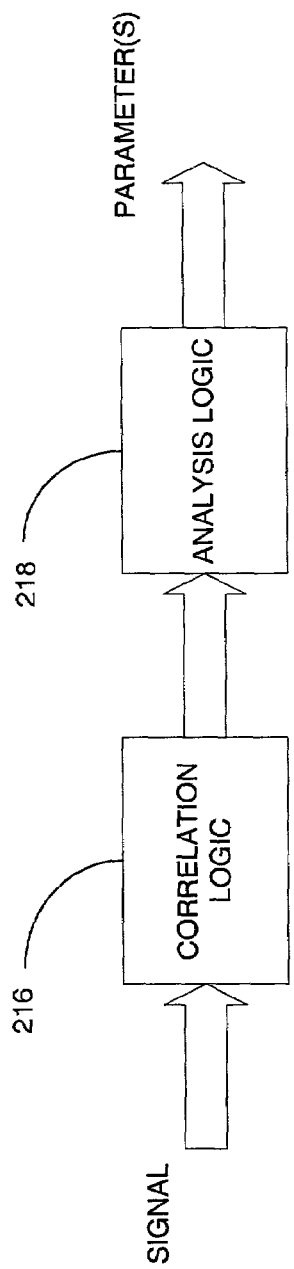
FIG. 2A is a simplified block diagram of one embodiment of a parameter estimator which may be employed in conjunction with a system according to the invention in the example application of FIG. 1.

Referring to FIG. 2A, a block diagram of one embodiment of a parameter estimator such as may be employed within subscriber station 100 is illustrated. As illustrated, in this embodiment, the parameter estimator comprises correlation logic 216 and analysis logic 218. For purposes of this disclosure, the term "logic" means hardware, software, or a combination of hardware and software.

A signal is input to correlation logic 216. The signal may be a standalone signal or part of a composite signal comprising multiple signals. Typically, the signal is a pilot signal from one of the base stations or sectors and is part of a composite signal representing the transmissions from multiple base stations or sectors. The signal from each base station or sector is modulated with an identification code which, in one example, is a PN code. The identification code may be modulated onto the signal on a one-time or repeating basis.

Correlation logic 216 is configured to determine, using an integration time I, the correlation between the signal and shifted versions of an identification code. Obviously, the greatest degree of correlation will be exhibited if the identification code used by the correlation logic 216 matches that modulated onto the signal. The correlation logic 216 outputs a correlation function which represents the correlation between the signal and shifted versions of the identification code within a search window.

In one example, each sample of the signal S is a complex number having in-phase (I) and quadrature (Q) components, and the signal S is modulated with a PN code. In one implementation, a correlation value C, which depends on the PN code and the shift s in the PN code which are used, is coherent, i.e., retains phase information, and is a complex number which can be expressed as follows:

$$C(PN, s) = \sum_{i=k+0}^{k+N-1} PN(i-s) \cdot S(i) \quad (1)$$

where N is the (coherent) integration time in terms of chips, S(i) are samples of the received signal, and k is an arbitrary origin. In this implementation, the integration time I is the coherent integration time N.

In a second implementation, the correlation value C is a real number which is derived by non-coherently, i.e., not retaining phase information, combining M successive coherent integrations, each conducted over N chips. In this implementation, the correlation value C may be expressed as follows:

$$C(PN, s) = \sum_{j=1}^{M} \sum_{i=k+(j-1)N}^{k+jN-1} |PN(i-s) \cdot S(i)| \quad (2)$$

In this implementation, the integration time I is the product of N and M.

The range of the shift s that is desired to be tested can be referred to as the search window W. The W values C(PN, s) which result together form a correlation function F(PN, s), which represents the degree of correlation between the signal and the shift s of the PN code (where the shift s is expressed in terms of chips) over a desired search window W. In the case where the PN code is repeatedly modulated onto the signal, the correlation function F(PN, s) will be periodic.

Figure 3A:
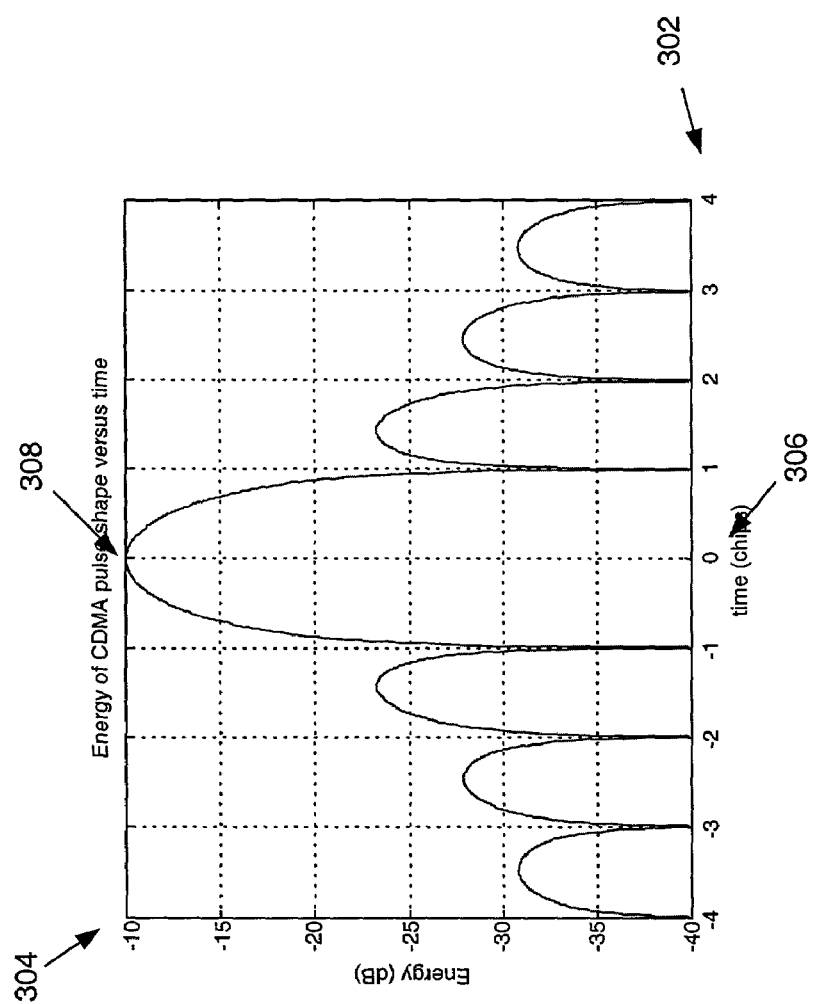
FIG. 3A is a time domain representation of one example of a correlation function for a CDMA pilot signal.

FIG. 3A illustrates an example of a correlation function F(PN, s) for a pilot signal in a CDMA wireless communication system. The window size (in terms of chips) in this example is 8, and the window is assumed to be centered at the origin 306. The horizontal axis 302 represents the shift of the PN code (expressed in terms of chips), and the vertical axis 304 represents the correlation function F(PN, s) (expressed in terms of Energy(dB)). As illustrated, the function in this example reaches a peak at the origin 306. This correlation function may constitute a component pulse in a real world correlation function derived from a composite signal representing a mixture of the pilot signals from multiple base stations or sectors, and multiple renderings of the same pilot signals arriving through different paths.

Figure 3B:
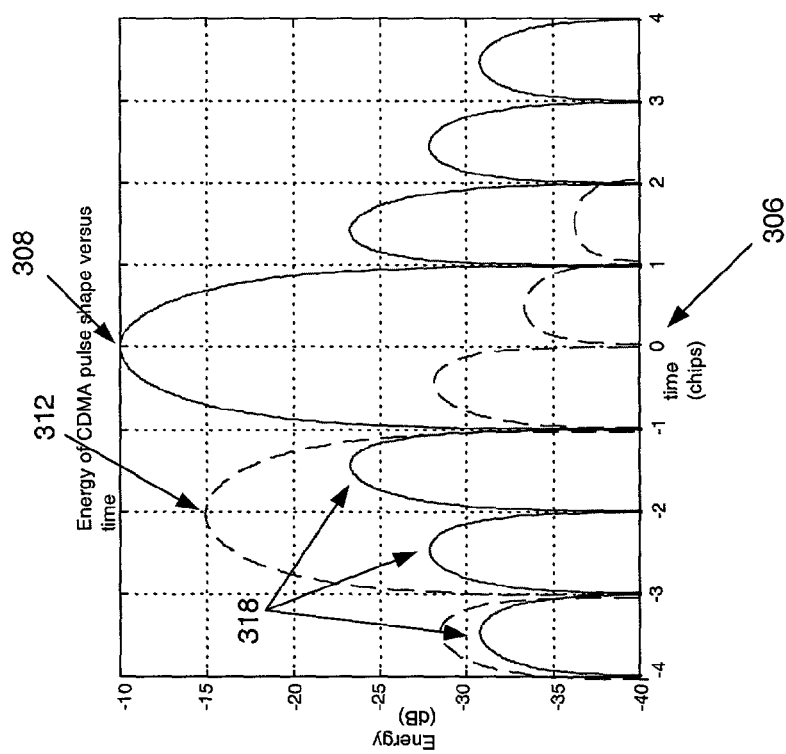
FIG. 3B illustrates direct line-of-sight and reflected renderings of the function of FIG. 3A.

Referring to FIG. 3B, an example of a correlation function F(PN, s) for a pilot signal in a CDMA communications system is illustrated where the effects of multi-path are depicted. The correlation function for a weaker earlier-in-time independent arrival, represented in the figure with a dashed line, is superimposed on the correlation function for a stronger independent arrival, which is represented in the figure with a solid line. The additive combination of these two correlation functions might represent the correlation function which is derived from a real world composite signal subject to the effects of multi-path and/or is a multi-path signal. For purposes of this disclosure, an "independent" arrival includes one of multiple signals from different sources which arrive at a destination as well as one of multiple renderings of the same signal which arrive at a destination through different routes.

Figure 3C:
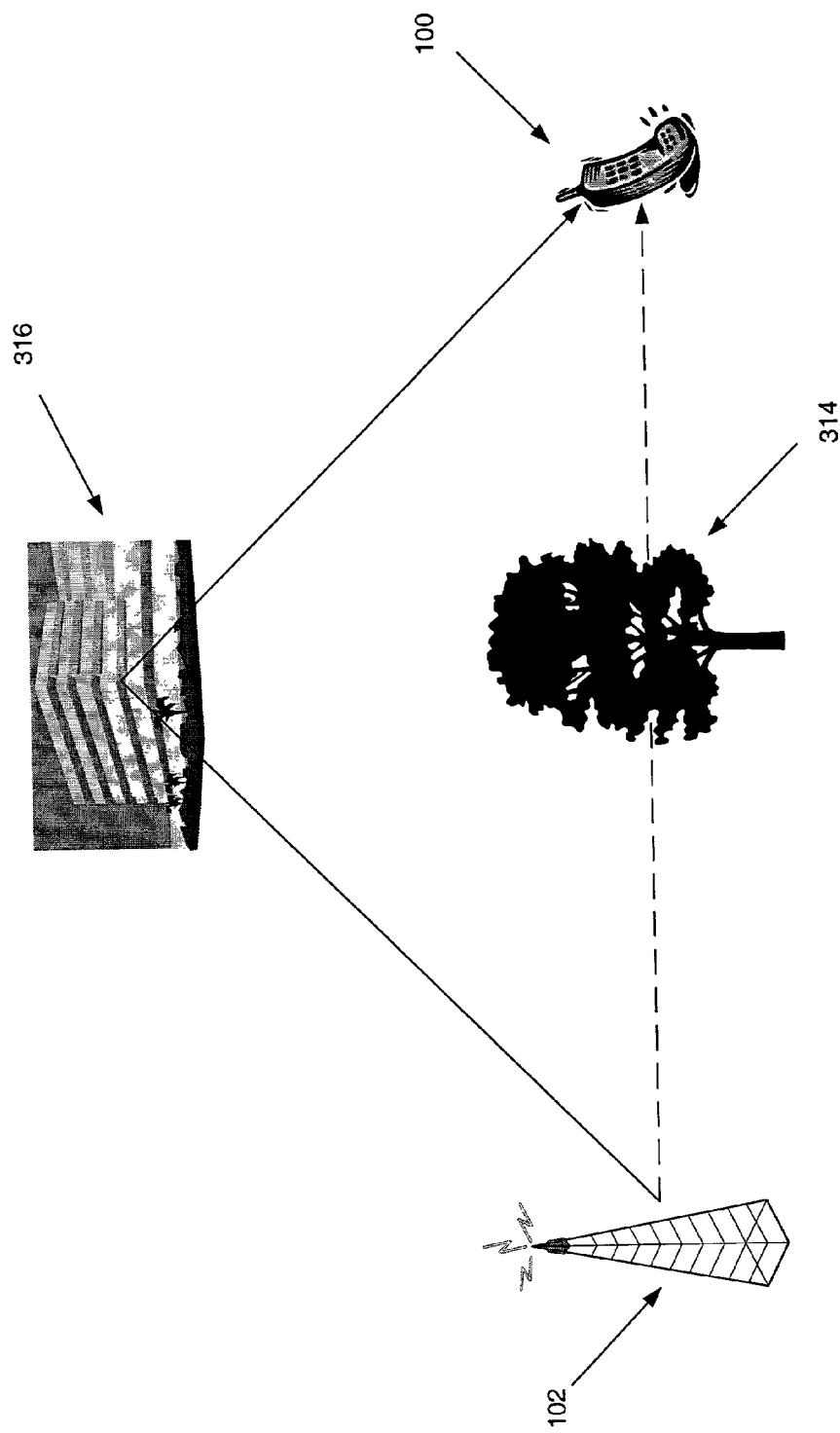
FIG. 3C illustrates direct and indirect arrivals of a pilot signal at a subscriber station due to multi-path.

FIG. 3C depicts an example of a situation which might give rise to the correlation function illustrated in FIG. 3B. As illustrated, the direct line-of-sight path between base station or sector 102 and subscriber station 100 is blocked by an obstruction 314 (a tree in the example) which attenuates but still allows passage of the pilot signal. At the same time, due to multi-path, the same pilot signal may reflect off of another obstruction 316 (a building in the example) and be received by the subscriber station 100 with less attenuation than the direct line-of-sight arrival. This reflection from obstruction 316 might give rise to the correlation function represented in FIG. 3B with a solid line, while the direct line or sight rendering through obstruction 314 might give rise to the correlation function represented in FIG. 3C with a dashed line.

Turning back to FIG. 2A, once determined, the correlation function is input to analysis logic 218. Analysis logic 218 analyzes this correlation function and determines whether one or more first peak(s) of the correlation function are present, and, if so, whether they are distinguishable from the sidelobe(s) of the second peak. If the one or more first peak(s) are present and distinguishable from the sidelobe(s) of the second peak, the analysis logic 218 is then configured to determine the one or more parameter(s) from the one or more first peak(s). If, however, the one or more first peak(s) are not present, or, if present, are not distinguishable from the sidelobe(s) of the second peak, the analysis logic 218 is configured to determine the one or more parameter(s) from the second peak.

Thus, in the example of FIG. 3B, the analysis logic 218 may be configured to estimate the time of arrival (TOA) of the pilot, which requires detecting the time/position of the earliest non-sidelobe peak in the correlation function for the pilot. The analysis logic may first detect the strongest peak 308, which is the second peak using the previous terminology. It may then determine whether there are any earlier peaks present, such as peak 312, and, if present, whether peak 312 represents an independent arrival or whether is one of the sidelobes 318 of the main peak 308. In the previous terminology, peak 312 is the first peak. If peak 312 is present and represents an independent arrival rather than a sidelobe of the main peak 308, the analysis logic 218 determines the time of arrival of the pilot responsive to the time/position of peak 312. If no peaks earlier than peak 308 are detected, which represent independent arrivals in contrast to sidelobe(s) of the main peak 308, analysis logic 218 estimates the time of arrival of the pilot responsive to the time/position of the main peak 308.

Figure 2B:
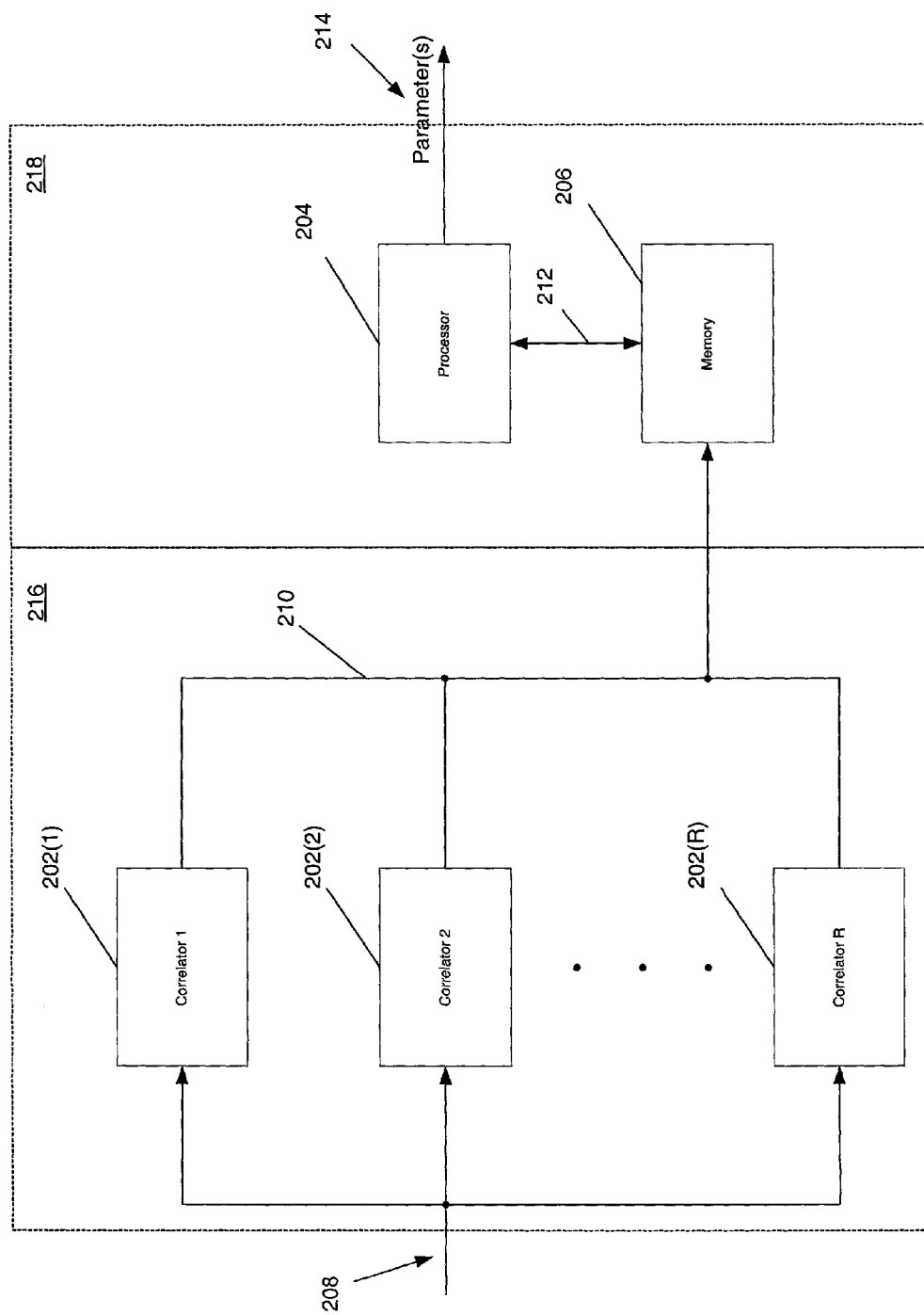
FIG. 2B is a simplified block diagram of one implementation of a parameter estimator which may be employed in conjunction with a system according to the invention in the example application of FIG. 1.

Referring to FIG. 2B, a block diagram of a second embodiment of a parameter estimator which may be employed within subscriber station 100 is illustrated. A signal 208 is input in parallel to each of R correlators 202(1), 202(2), . . . , 202(R), where R is an integer of one or more, over one or more signal line(s) 208. Again, the signal 208 may be a standalone signal or a part of a composite signal. In one implementation example, R is 16. In a second implementation example, R is 256. Each of the R correlators determines, in parallel, using an integration time, a correlation value representing the degree of correlation between a shifted version of a selected PN code and the signal.

In one implementation, each of the R correlators operates using a shifted version of the same PN code, with each correlator assigned a different shift value. The collection of correlation values determined by the R correlators forms the correlation function F(PN, s). If the window size W is less than or equal to R, the number of correlators, the correlation function F(PN, s) can be determined through a single pass through the parameter estimator. If, on the other hand, the number of correlators R is less than W, the window size, one or more additional iterations through the parameter estimator may be needed to determine the correlation function F(PN, s).

Once determined, the correlation function F(PN, s) is output on one or more signal line(s) 210 and stored in memory 206. In like manner, the correlation functions for other PN codes can be determined by the correlators 202(1), 202(2), . . . , 202(R), and stored in memory 206.

The processor 204 is configured to retrieve a correlation function F(PN, s) from memory 206 over one or more signal line(s) 212, and determine whether one or more first peak(s) are present, and if so, whether they are distinguishable from the sidelobe(s) of a second peak. If such peak(s) are present and distinguishable from the sidelobe(s) of the second peak, it then estimates the one or more parameter(s) from the one or more first peak(s). If such peak(s) are not present, or, if present, are not distinguishable from the sidelobe(s) of the second peak, processor 204 then estimates the one or more parameter(s) from the second peak.

In one implementation, the processor 204 attempts to estimate time of arrival (TOA), and energy per chip divided by total received power ($E_c I_0$) for the signal. If the attempt is unsuccessful, the processor 204 may direct the R correlators 202(1), 202(2), . . . , 202(R) to re-determine the correlation function using a different integration time. This process may iterate one or more times until the one or more parameter(s) may be estimated from the correlation function or it is determined that the parameter(s) cannot be estimated. If the one or more parameter(s) can be and are estimated, the processor 204 may be configured to output them over one or more signal line(s) 214.

For purposes of this disclosure, a "processor" may be any device capable of executing a series of instructions embodying a process, including but not limited to a computer, microprocessor, an ASIC, finite state machine, DSP, or some other mechanism.

In addition, for purposes of this disclosure, a "memory" may be any device readable by a processor and capable of storing a series of instructions embodying a process, including but not limited to RAM, ROM, EPROM, EEPROM, PROM, disk (hard or floppy), CD-ROM, DVD, flash memory, etc.

Figure 4:
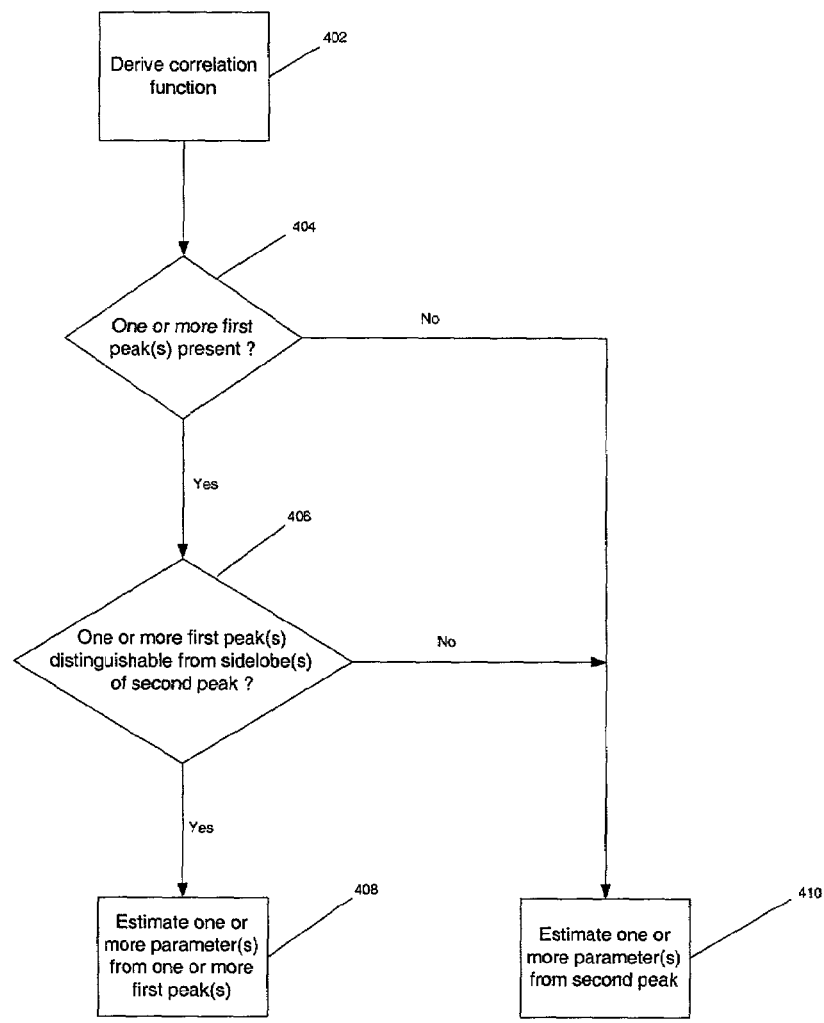
FIG. 4 is a flowchart of one embodiment of a method of attempting to distinguish one or more first peaks of a correlation function from a second peak thereto, and estimating one or more parameter(s) of a signal responsive thereto.

Referring to FIG. 4, a flowchart of one embodiment of a method which may be employed by analysis logic 218 and/or processor 204 for estimating one or more parameter(s) of a signal, e.g., time of arrival, is illustrated. The method begins with step 402, which comprises deriving a correlation function from a signal. It then proceeds to step 404, which comprises determining whether one or more first peak(s) are present. If so, the method proceeds to step 406. If not, the method branches to step 410.

In step 406, the method determines whether the one or more first peak(s) are distinguishable from one or more sidelobe(s) of a second peak. If so, the method proceeds to step 408, which comprises estimating the one or more parameter(s) responsive to the one or more first peak(s). In the case where the parameter is time of arrival, the method estimates the parameter responsive to the time/position of the second peak. If not, the method branches to step 410.

In step 410, the method estimates the one or more parameter(s) responsive to the second peak. In the case where the parameter is time of arrival, the method estimates the parameter responsive to the time/position of the second peak.

The system and/or method of the invention may be part of analysis logic 218 in FIG. 2A, be embodied by the combination of processor 204 and memory 206 in FIG. 2B, or be separate distinct from analysis logic 218 and/or processor 204/memory 206. Moreover, it should be appreciated that many other applications of the parameter estimator of the invention are possible, so this example should not be taken as limiting.

Embodiments of the Invention

Figure 5A:
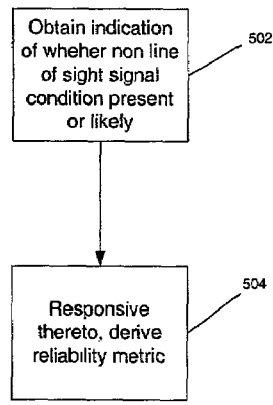
FIG. 5A is a flowchart of a first embodiment of a method according to the invention in which a reliability metric is derived responsive to an indication of whether a non line of sight signal condition is present or likely.

The invention provides a method of producing a reliability metric for a parameter estimate derived from a signal using correlation analysis. One embodiment of the method is illustrated in FIG. 5A. As illustrated, the embodiment begins in step 502, which comprises obtaining an indication of whether a non line of sight signal condition is present or likely. Responsive to this indication, in step 504, the embodiment derives a reliability metric for the parameter estimate.

In one implementation, the parameter estimate is an estimate of time of arrival (TOA) of the signal, and the reliability metric is root mean square error (RMSE) of the time of arrival estimate. As previously discussed, the time of arrival estimate may be derived from the time/position of a peak of a correlation function for the signal. In this implementation, the method obtains an indication of whether a non line of sight signal condition is present or likely based on a measure of the strength of the correlation function at the peak thereof. If the strength of signal is weak, it is assumed that a non line of sight signal condition is present or likely, while if the strength of the signal is strong, it is assumed that the signal is a line of sight signal.

Figure 6A:
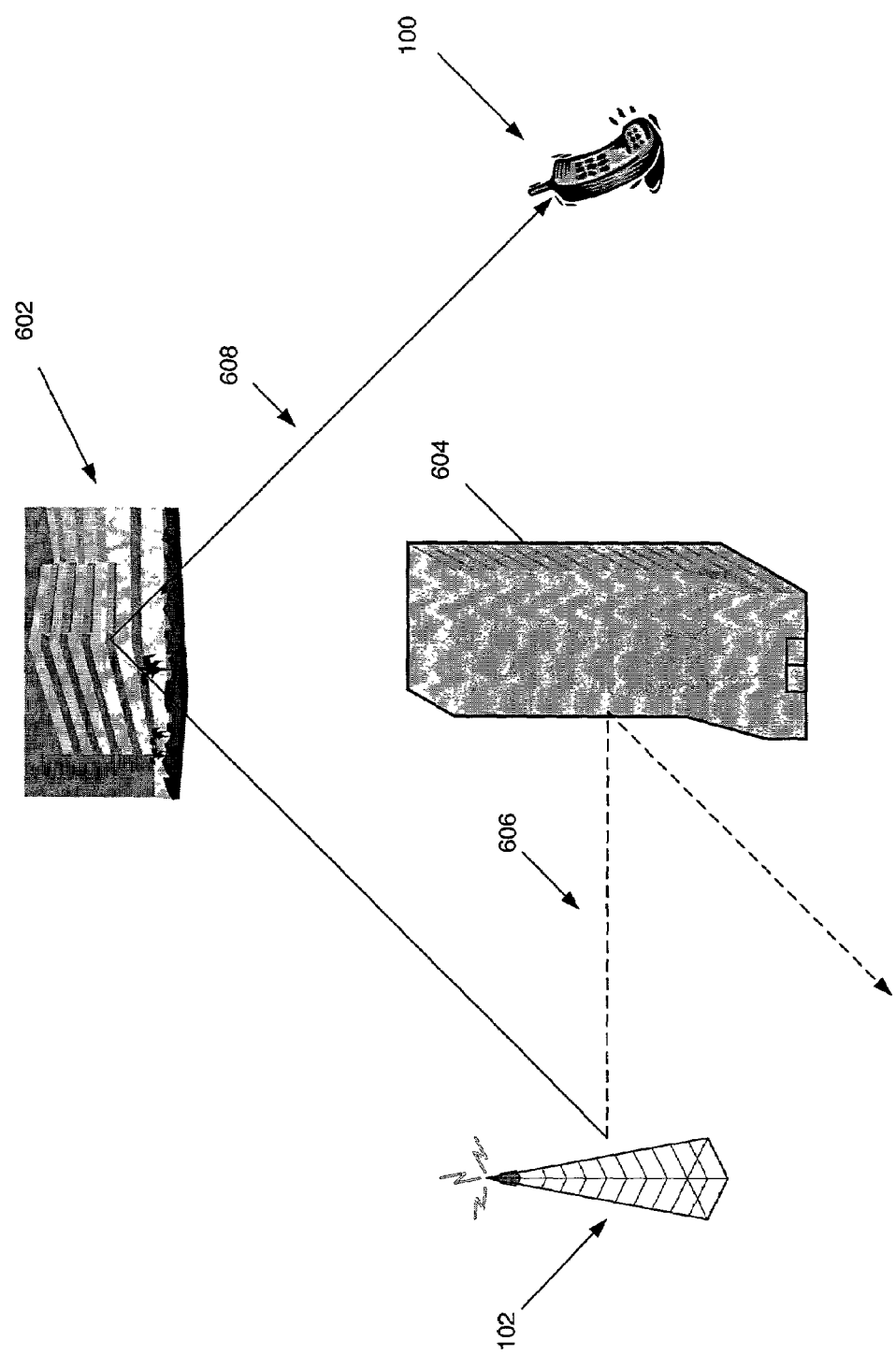
FIG. 6A illustrates an example scenario in which a pilot signal is a non line of sight signal.

This assumption may be further explained in relation to FIG. 6A, which illustrates a scenario in which the line of sight path between base station or sector 102 and subscriber station 100 is blocked by obstruction 604. Consequently, the signal 606 representing the direct line of sight arrival from base station or sector 102 does not reach subscriber station 100.

However, signal 608, which represents a delayed multipath arrival, reflects off of obstruction 602 and is received by the subscriber station 100. Because of the attenuation due to the additional distance traveled by signal 608 compared to the direct line of sight path, and also because of reflection losses off of obstruction 602, the peak strength of the correlation function derived from the signal is typically lower than that for the correlation function that would be derived from the line of sight signal.

Figure 7A:
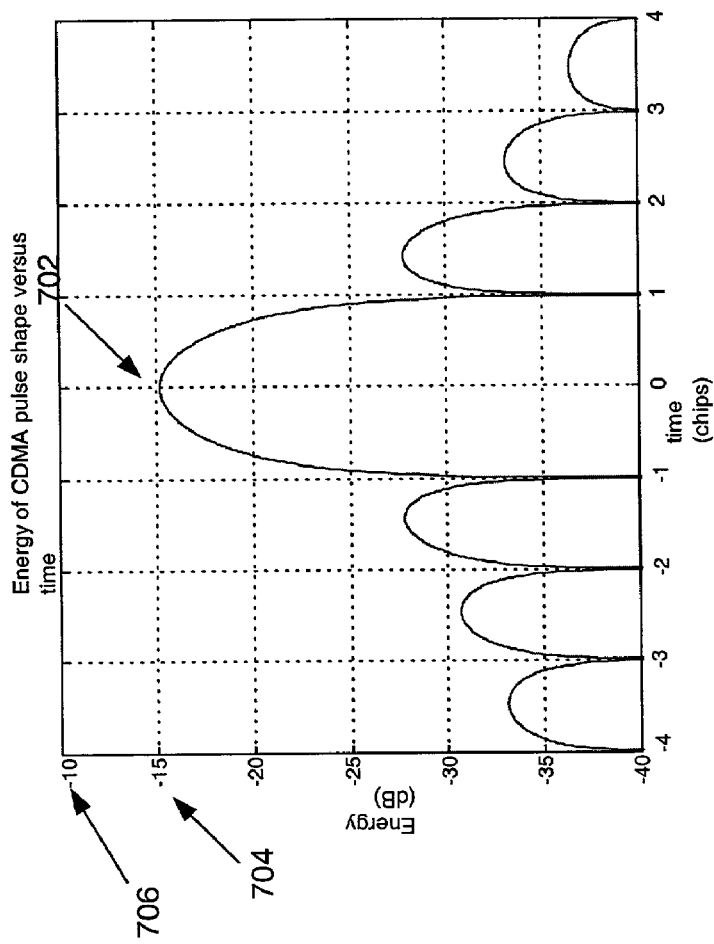
FIG. 7A illustrates a correlation function which may result from the example scenario of FIG. 6A.

FIG. 7A is an example of the correlation function which might be derived from the signal 608. As illustrated, the peak strength 704 of the function is less than the assumed peak strength 706 for a direct line of signal. In the embodiment of the method illustrated in FIG. 5A, this information is used to indicate that a non line of sight signal condition is present or likely, i.e., that the signal 608 is not or unlikely to be a line of sight signal, and thus, that a time of arrival estimate derived from the peak 702 of the correlation function would be inaccurate.

The measure of the strength of the correlation function at the peak thereof may be energy per chip divided by total received power ($E_c/I_0$). Alternatively, or in addition, the measure of the strength of the correlation function at the peak thereof may be the energy of the correlation function at the peak.

In one implementation, the RMSE of the TOA estimate is derived using a lookup table. The lookup table may implement a non-linear relationship between the RMSE of the TOA estimate and the strength of the correlation function at the peak thereof. Alternatively, or in addition, the lookup table may implement a relationship between the RMSE of the TOA estimate, the strength of the correlation function at the peak thereof, and the integration time used to derive the correlation function. The relationship implemented by the lookup table may be an inverse relationship where the RMSE which is derived varies inversely with the strength of the correlation function at the peak thereof.

In one example, the RMSE is a function of N, the coherent integration time in terms of chips, M, the number of coherent integrations which are non-coherently combined to form a correlation value, and the peak energy E of the correlation function derived from the signal. For a given value of N and M, the RMSE is an inverse function of E. The function relating RMSE (in terms of meters), N, M, and E in this example may be implemented through the following lookup table:

| RMSE (meters) | N = 768<br>M = 8 | N = 1024<br>M = 16 | N = 512<br>M = 2 | N = 1024<br>M = 64 |
|---|---|---|---|---|
| 10 | 21370 | 37201 | 9642 | 65535 |
| 20 | 4955 | 9267 | 2039 | 21097 |
| 30 | 4682 | 8802 | 1913 | 20304 |
| 50 | 4346 | 8230 | 1757 | 19328 |
| 75 | 4114 | 7835 | 1649 | 18653 |
| 100 | 3897 | 7466 | 1549 | 18023 |
| 125 | 3695 | 7121 | 1455 | 17435 |
| 150 | 3506 | 6800 | 1368 | 16887 |
| 175 | 3329 | 6499 | 1286 | 16375 |
| 200 | 3164 | 6218 | 1209 | 15897 |
| 250 (and above) | 2915 | 5794 | 1094 | 15170 |

The leftmost column in this example lists the RMSE values, and each of the columns to the right of this lists corresponding values of E for particular values of N and M. This table may be employed by first deriving a correlation function for a signal using particular search parameters (N, M). The peak strength of the resulting correlation function is then measured, and the closest value of E equal to or below the measured strength in the column corresponding to the search parameters used is determined. The corresponding RMSE value from the lookup table becomes the RMSE which is assigned to the measured value. For example, for search parameters equal to (768, 8), and a measured peak energy of 4400, the lookup table will report a RMSE of 50 meters. It should be appreciated that other examples are possible so this example should not be construed as limiting.

In a second implementation, the RMSE of the TOA estimate is derived using a formula. The formula may implement a non-linear relationship between the RMSE of the TOA estimate and the strength of the correlation function at the peak thereof. Alternatively, or in addition, the formula may implement a relationship between the RMSE of the TOA estimate, the strength of the correlation function at the peak thereof, and the integration time used to derive the correlation function. The relationship implemented by the formula may be an inverse relationship where the RMSE which is derived varies inversely with the strength of the correlation function at the peak thereof.

In one example, the peak signal strength is expressed in terms of $E_c/I_0$, and the following formula may be used to derive RMSE:

$$RMSE = \frac{A}{\frac{E_c}{I_0}} + B \qquad (3)$$

where A and B are constants which depend on the particular implementation. In one implementation, A is 0.2 and B is 10, while in another implementation, A is 0.5 and B is 0. In the first implementation, for values of $E_c/I_0$ ranging from −4 dB to −30 dB, the reported values of RMSE range from 10 to 223. In the second implementation, for values of $E_c/I_0$ ranging from −3 dB to −26 dB, the reported values of RMSE range from 1 to 224. However, other examples are possible, so this example should not be taken as limiting.

In a second example, the peak signal strength is the peak energy E in linear terms. Referring to the peak energy in linear terms as y, the following formula may be used to derive the RMSE estimate:

$$RMSE = \frac{G^2MN^2}{A \times (y - G^2MN)} + B \qquad (4)$$

where $G^2$ is a scaling factor (9/2048 in one example), N is the coherent integration time, M is the number of coherent integrations which are non-coherently combined to form a correlation vale, y is the peak signal strength in linear terms, and A and B are constants which depend on the application. In one implementation, the value of A is 5 and B is 10, while, in a second implementation, the value of A is 2 and the value of B is 0. It should be appreciated that other examples are possible so this example should not be taken as limiting.

In the first implementation, the RMSE value which is reported is an 8-bit unsigned quantity with values ranging from 10 to 223. Under this assumption, the value of RMSE in the first implementation may be given as:

$$RMSE = \begin{cases} 10 & y > 0.4G^2MN^2 + G^2MN \\ 223 & y \leq \frac{G^2MN^2}{1065} + G^2MN \\ \frac{G^2MN^2}{5 \times (y - G^2MN)} + 10 & \text{otherwise} \end{cases} \qquad (5)$$

In the second implementation, the RMSE value which is reported is an 8-bit unsigned entity with values ranging from 1 to 255. Under the assumption, the value of RMSE in this second implementation may be given as:

$$RMSE = \begin{cases} 1 & y \geq 0.5G^2MN^2 + G^2MN \\ 255 & y \leq \left\lceil \frac{0.5G^2MN^2}{255} \right\rceil + G^2MN \\ \frac{0.5G^2MN^2}{y - G^2MN} & \text{otherwise} \end{cases} \qquad (6)$$

Note that other examples are possible so the above examples should not be construed as limiting.

Figure 5B:
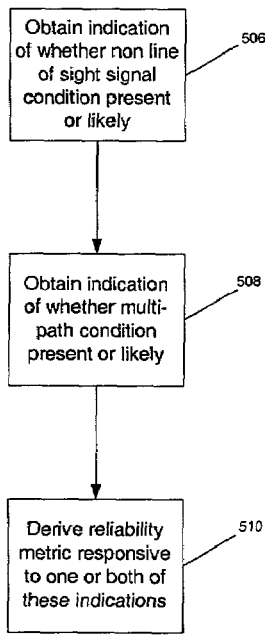
FIG. 5B is a flowchart of a second embodiment of a method according to the invention in which a reliability metric is derived responsive to one or both of an indication of whether a non line of sight signal condition is present or likely and an indication of whether a multi-path signal condition is present or likely.

Referring to FIG. 5B, a flowchart of a second embodiment of a method according to the invention is illustrated. In step 506, the embodiment obtains an indication of whether a non line of sight signal condition is present or likely, and in step 508, the embodiment determines whether a multi-path signal condition is present or likely. Responsive to one or both of these indications, the method, in step 510, derives a reliability metric for the parameter estimate.

This embodiment recognizes that lack of line of sight and multi-path, since they are related, may have duplicative contributions to computation of the reliability metric. However, it also recognizes that they may have separate and distinct contributions to the computation of the reliability metric.

Consider FIG. 6A. That figure illustrates a scenario where the indication that the signal 608 is not or unlikely to be a line of sight signal and the determination that the signal 608 is or likely to be a multi-path signal may be redundant in that the one can account for the other in the computation of the reliability metric.

Figure 6B:
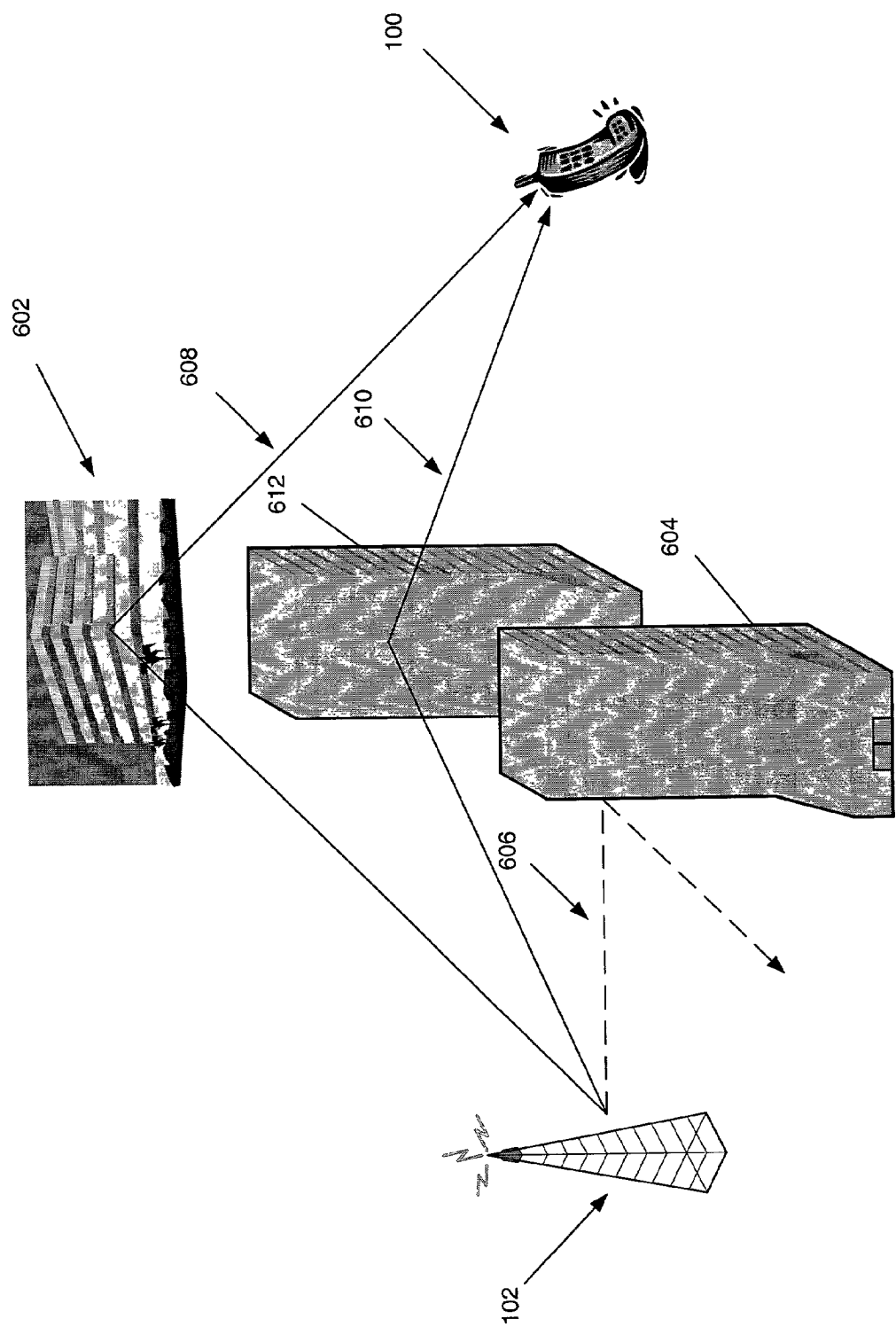
FIG. 6B illustrates an example scenario in which a pilot signal is subject to multi-path and/or is a multi-path signal.

However, FIG. 6B illustrates a scenario where the two indications may have separate and distinct contributions to the computation of the reliability metric. As illustrated, signal 608 is a multi-path signal which arrives at subscriber station 100 after reflecting off of obstruction 602, while signal 610 is a second multi-path signal which arrives at subscriber station 100 after reflecting off of obstruction 612. Line of sight signal 606 is blocked by obstruction 604 and does not arrive at the subscriber station 100.

Figure 7B:
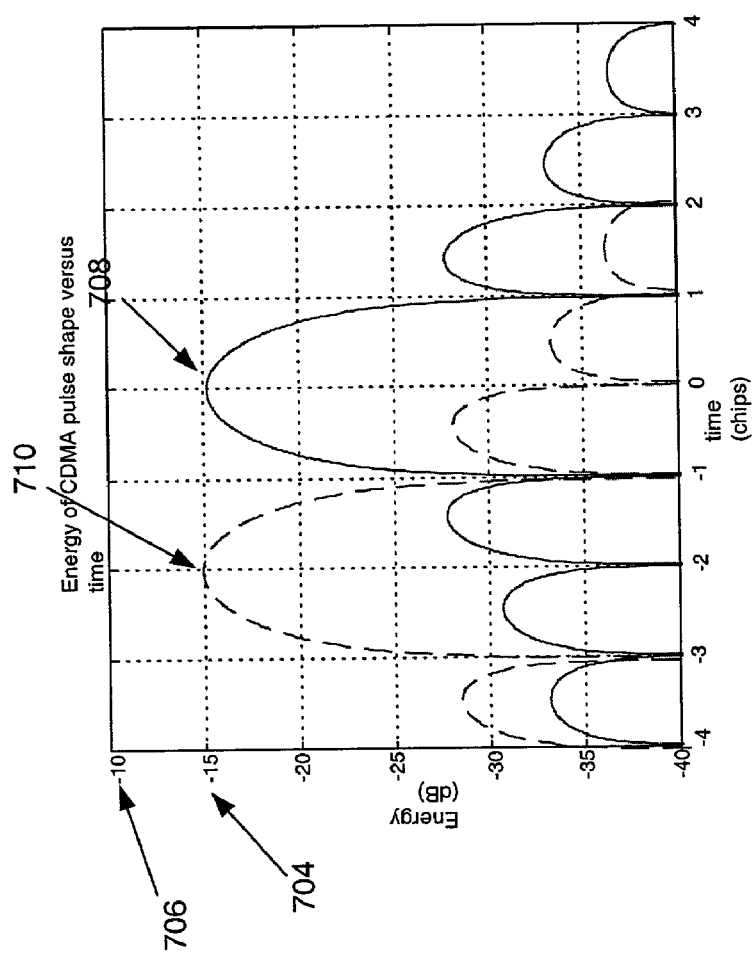
FIG. 7B illustrates a correlation function which may result from the example scenario of FIG. 6B.

FIG. 7B illustrates the correlation function which might result from this scenario. The portion of this correlation function which is represented with the solid line might result from the signal 608, while the portion which is represented with the dotted line might result from the signal 610. Since both are non line of sight signals, the peak signal strength of both, identified in FIG. 7A as 702, is below the maximum level 706 which marks a direct line of sight signal. The indication that either or both are or likely to be a non line of sight signal may make a first contribution to the computation of a reliability metric for a time of arrival estimate derived from either of the peaks 708, 710. However, the indication that either or both are or likely to be multi-path signals whose correlation functions may interfere with one another may have a second distinct contribution to the computation of the reliability metric. In particular, an assessment of the likelihood of distinguishing an earlier peak of the correlation function from a later-in-time peak can be measured and accounted for in the computation of the reliability metric.

For example, referring to FIG. 7B, the fact that the two peaks 708 and 710 are close to each other and are similar in amplitude may make it more difficult to distinguish the two peaks from one another. This circumstance could be detected from an analysis of the correlation function, and separately accounted for in the computation of the reliability metric. Or, referring to FIG. 3B, which is another example of a correlation function which results from multi-path, the fact that peak 312 is of lower strength than peak 308 and therefore may not be distinguishable from the sidelobes of peak 312, is another circumstance that could be determined from an analysis of the correlation function, and separately accounted for in the computation of the reliability metric.

Figure 5C:
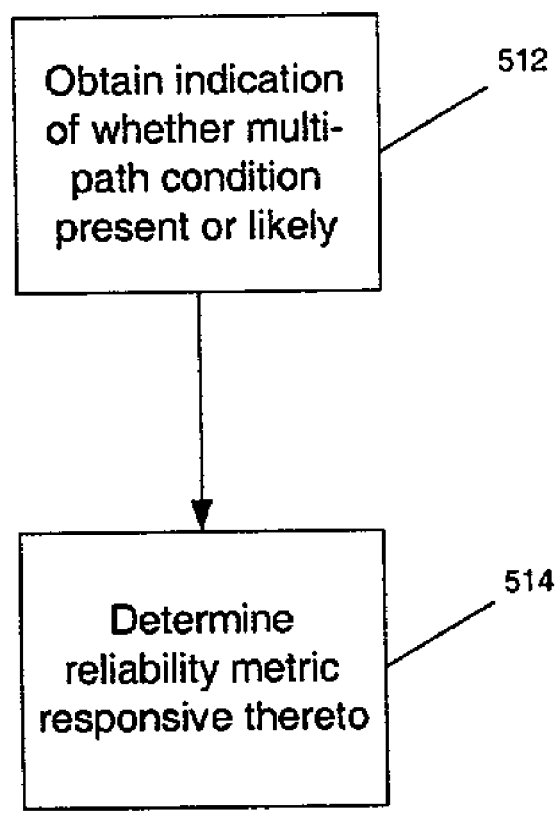
FIG. 5C is a flowchart of a third embodiment of a method according to the invention in which a reliability metric is derived responsive to an indication of whether a multi-path signal condition is present or likely.

Referring to FIG. 5C, a third embodiment of a method according to the invention is illustrated. As illustrated, this embodiment begins with step 512, which comprises obtaining an indication of whether a multi-path signal condition is present or likely. The embodiment then proceeds to step 514, in which, responsive to this indication, a reliability metric for the parameter estimate is derived.

When the technique represented by any of these embodiments, implementations or examples is applied to a signal subject to degradation caused by lack of line of sight and/or multi-path, compared to the GPS method, performance is greatly improved since parameters of these signals such as the time of arrival can now be accurately weighted.

Any of the foregoing methods may be tangibly embodied in a variety of forms, including but not limited to, a form where a series of instructions embodying the method is stored on a processor readable medium or a server in a computer network such as the Internet, where the method is embodied as synthesized logic, or where the method is embodied as a computer program product, i.e., a code segment or module.

Figure 8A:
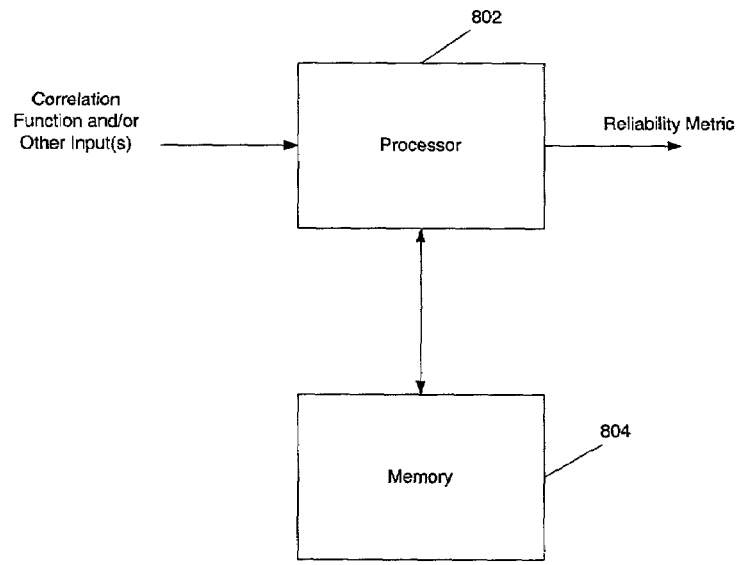
FIG. 8A is a block diagram of a first embodiment of a system according to the invention.

Various embodiments of systems for performing any of the foregoing methods are also possible. FIG. 8A illustrates a first embodiment of such a system which comprises a processor 802 coupled to a memory 804. Any of the foregoing methods may be tangibly embodied as a series of instructions stored in memory 804. Processor 802 receives as input(s) a correlation function derived from a signal which may be subject to degradation due to factors such as lack of line of sight and multi-path, and may receive other inputs besides the correlation function for the purpose of obtaining an indication of whether a non line of sight signal condition is present or likely and/or a multi-path signal condition is present or likely. The processor 802 is configured to retrieve and execute the instructions stored in the memory 804, and thereby perform the method embodied therein. The reliability metric which is produced may then be output from the processor 802.

Figure 8B:
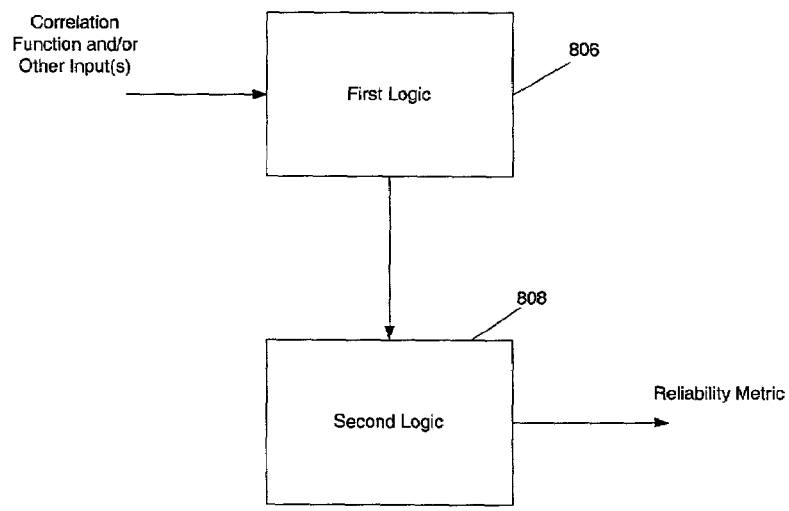
FIG. 8B is a block diagram of a second embodiment of a system according to the invention.

FIG. 8B illustrates a second embodiment of a system for performing any of the foregoing methods. As illustrated, this embodiment of the system comprises first logic 806 and second logic 808. First logic 806 receives as input(s) a correlation function derived from a signal which may be subject to degradation due to factors such as lack of line of sight and multi-path, and may receive other inputs besides the correlation function for the purpose of providing an indication of whether a non line of sight signal condition is present or likely and/or a multi-path signal condition is present or likely. The first logic 806 is configured to provide the indication of whether a non line of sight signal condition is present or likely and/or provide an indication of whether a multi-path signal condition is present or likely responsive to these one or more inputs.

These one or more indications are provided to second logic 808. Responsive to one or both of these indications, the second logic 808 is configured to determine and output a reliability metric.

While various embodiments of the invention have been described, it will be apparent to those of ordinary skill in the art that many more embodiments and implementations are possible that are within the scope of this invention.

What is claimed is:

1. A method comprising:
   determining whether a non-line of sight signal condition is present based on at least one of a strength of a correlation function at a peak compared to an expected strength or distinguishing a first peak from a sidelobe of a second peak;
   obtaining an indication of the non-line of sight signal condition based on a measure of the correlation function at the peak;
   deriving a reliability metric for a parameter estimate based in part on the indication, and wherein the reliability metric has a non-linear relationship to the indication of the non-line of sight signal condition;
   determining whether a multi-path signal condition is present; and
   determining whether the multi-path signal condition provides a contribution to the reliability metric independent of a contribution from the non-line of sight condition, and
   wherein deriving the reliability metric comprises deriving the reliability metric based on an independence of the contributions.

2. The method of claim 1 wherein the parameter estimate is an estimate of time of arrival (TOA) of a signal.

3. The method of claim 2 wherein the reliability metric is root mean square error (RMSE) of the time of arrival estimate.

4. The method of claim 3 wherein the time of arrival estimate is derived from a peak of a correlation function for the signal.

5. The method of claim 4 wherein the measure of the correlation function comprises a measure of a strength of the correlation function at the peak thereof.

6. The method of claim 5 wherein the measure of the strength of the correlation function at the peak thereof comprises a measure of an energy per chip divided by total received power ($E_c/I_o$).

7. The method of claim 5 wherein the measure of the strength of the correlation function at the peak thereof comprises a measure of an energy of the correlation function at the peak.

8. The method of claim 5 wherein the RMSE of the TOA estimate is derived using a lookup table.

9. The method of claim 8 wherein the lookup table implements a nonlinear relationship between the RMSE of the TOA estimate and the strength of the correlation function at the peak thereof.

10. The method of claim 1, tangibly embodied as a series of instructions stored on a processor readable medium.

11. The method of claim 1, tangibly embodied on a server.

12. The method of claim 1, wherein the reliability metric has an inverse relationship to the measure of the correlation function.

13. The method of claim 1 wherein determining whether the multi-path signal condition is likely comprises:
   identifying the first peak and the second peak; and
   distinguishing the first peak from the sidelobe of the second peak.

14. A method comprising:
   determining whether a non-line of sight signal condition is present based on at least one of a strength of a correlation function at a peak compared to an expected strength or distinguishing a first peak from a sidelobe of a second peak;
   obtaining an indication of the non-line of sight signal condition based on a measure of the correlation function at the peak, wherein the measure of the correlation function comprises a measure of a strength of the correlation function at the peak thereof; and
   deriving a reliability metric for a parameter estimate based in part on the indication, wherein the narameter estimate is an estimate of time of arrival (TOA) of a signal, the TOA estimate derived from the peak of the correlation function for the signal, wherein the reliability metric has a non-linear relationship to the indication of the non-line of sight signal condition, and wherein the reliability metric comprises root mean sguare error (RMSE) of the TOA estimate derived using a lookup table, and
   wherein the lookup table implements a relationship between the RMSE of the TOA estimate, the strength of the correlation function at the peak thereof, and the integration time used to derive the correlation function.

15. A method comprising:
   determining whether a non-line of sight signal condition is present based on at least one of a strength of a correlation function at a peak compared to an expected strength or distinguishing a first peak from a sidelobe of a second peak:
   obtaining an indication of the non-line of sight signal condition based on a measure of the correlation function at the peak, wherein the measure of the correlation function comprises a measure of a strength of the correlation function at the peak thereof; and
   deriving a reliability metric for a parameter estimate based in part on the indication, wherein the parameter estimate is an estimate of time of arrival (TOA) of a signal, the TOA estimate derived from the peak of the correlation function for the signal, wherein the reliability metric has a non-linear relationship to the indication of the non-line of sight signal condition, and wherein the reliability metric comprises root mean sciuare error (RMSE) of the TOA estimate derived using a lookup table, and wherein a formula implements a relationship between the RMSE of the TOA estimate, the strength of the correlation function at the peak thereof, and the integration time used to derive the correlation function.

16. A system for providing a reliability metric for a parameter estimate derived from a signal using correlation analysis comprising:

first logic for providing an indication of whether a non-line of sight signal condition is present and determining whether a multi-path signal condition is present based on at least one of a strength of a correlation function at a peak compared to an expected strength or distinguishing a first peak from a sidelobe of a second peak; and second logic for deriving a reliability metric for the parameter estimate responsive to the indication provided by the first logic, determining whether the multi-path signal condition provides a contribution to the reliability metric independent of a contribution from the non-line of sight condition, wherein deriving the reliability metric comprises deriving the reliability metric based on an independence of the contributions, and wherein the reliability metric has an inverse relationship to the strength of the correlation function at the peak.

17. The system of claim 16 wherein the parameter estimate is an estimate of time of arrival (TOA) of the signal.

18. The system of claim 17 wherein the reliability metric is root mean square error (RMSE) of the time of arrival estimate.

19. The system of claim 18 wherein the time of arrival estimate is derived from a peak of a correlation function for the signal.

20. The system of claim 19 wherein the first logic is configured to provide an indication of whether a non line of sight signal condition is present based on a measure of the strength of the correlation function at the peak thereof.

21. The system of claim 20 wherein the measure of the strength of the correlation function at the peak thereof is energy per chip divided by total received power ($E_c/I_o$).

22. The system of claim 20 wherein the measure of the strength of the correlation function at the peak thereof is the energy of the correlation function at the peak.

23. The system of claim 20 wherein the second logic is configured to derive the RMSE of the TOA estimate using a lookup table.

24. The system of claim 23 wherein the lookup table implements a non-linear relationship between the RMSE of the TOA estimate and the strength of the correlation function at the peak thereof.

25. A system for providing a reliability metric for a parameter estimate derived from a signal using correlation analysis comprising:

first logic for providing an indication of whether a non-line of sight signal condition is present based on at least one of a strength of a correlation function at a peak compared to an expected strength or distinguishing a first peak from a sidelobe of a second peak; and second logic for deriving a reliability metric for a parameter estimate responsive to the indication provided by the first logic, wherein the parameter estimate is an estimate of time of arrival (TOA) derived from a peak of a correlation function for a signal, wherein the reliability metric is root mean square error (RMSE) of the TOA estimate, and wherein the reliability metric has an inverse relationship to the strength of the correlation function at the peak, wherein the second logic is conflaured to derive the RMSE of the TOA estimate using a lookup table, and wherein the lookup table implements a relationship between the RMSE of the TOA estimate, the strength of the correlation function at the peak thereof, and the integration time used to derive the correlation function.

26. A system for providing a reliability metric for a parameter estimate derived from a signal using correlation analysis comprising:

first logic for providing an indication of whether a non-line of sight signal condition is present based on at least one of a strength of a correlation function at a peak compared to an expected strength or distinguishing a first peak from a sidelobe of a second peak; and second logic for deriving a reliability metric for a parameter estimate responsive to the indication provided by the first logic, wherein the parameter estimate is an estimate of time of arrival (TOA) derived from a peak of a correlation function for a signal, wherein the reliability metric is root mean square error (RMSE) of the TOA estimate, and wherein the reliability metric has an inverse relationship to the strength of the correlation function at the peak, wherein a formula implements a relationship between the RMSE of the TOA estimate, the strength of the correlation function at the peak thereof, and the integration time used to derive the correlation function.

* * * * *